April 17, 1928.
L. S. HARBER
DOUGH TREATING
Filed May 26, 1922
1,666,647
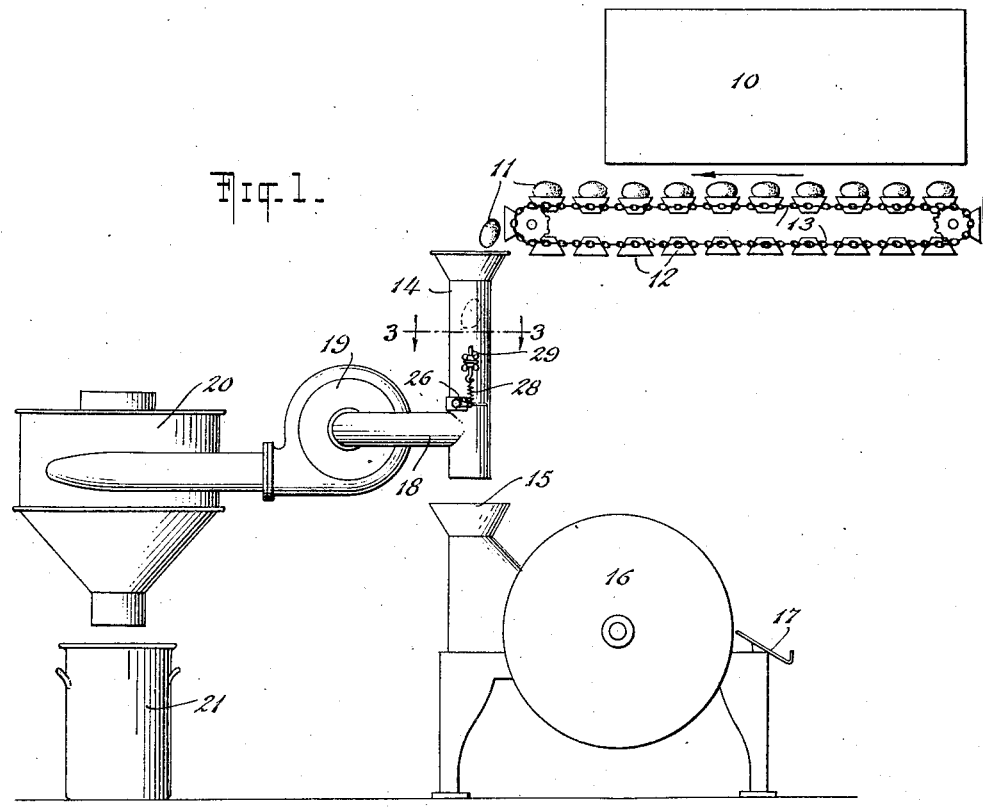
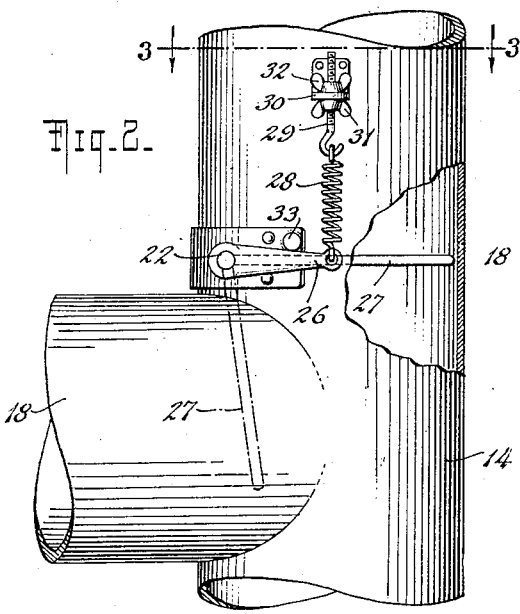
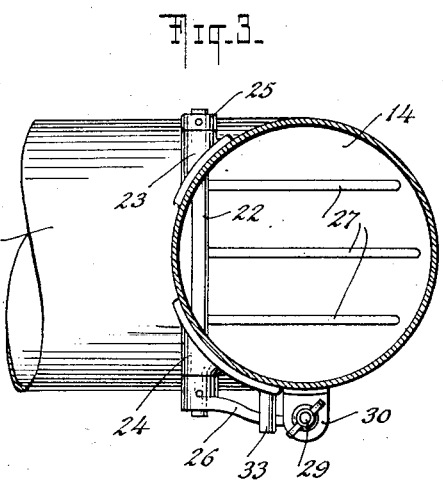
INVENTOR
LAURENCE S. HARBER
BY
Lotka, Kohlenbeck & Mathé
ATTORNEYS Patented Apr. 17, 1928.

1,666,647

UNITED STATES PATENT OFFICE.

LAURENCE SEYMOUR HARBER, OF WHITE PLAINS, NEW YORK, ASSIGNOR TO JOSEPH BAKER SONS & PERKINS COMPANY, INC., OF WHITE PLAINS, NEW YORK, A CORPORATION OF NEW YORK.

DOUGH TREATING.

Application filed May 26, 1922. Serial No. 563,784.

This invention relates to an improved method of, and apparatus for, treating and handling dough in the manufacture of bread, and its purpose is, in a general way, to improve the quality and appearance of the loaves of bread.

In the manufacture of bread on a large scale, the dough is placed in bulk into a dividing machine which divides such dough into pieces of the desired weight and discharges them into what is commonly called the rounder, which forms the dough pieces into approximately spherical shape. From the rounder the dough balls are delivered to the automatic proofer in which they remain for a definite period before being delivered singly into a final moulder which moulds the dough balls into an elongated cylindrical shape to fit the pans in which the bread is baked. Before reaching the baking oven the pans with the dough balls or rolls pass through what is commonly called the final steam proofer.

During the various stages of manufacture just referred to, the dough balls are abundantly dusted with flour to prevent them from sticking to any surface with which they come in contact. When the dough balls are rolled into cylindrical shape as just mentioned, this surplus flour coating the balls is worked into the roll of dough, and it has been found that this flour as well as the free flour (which is always present during the various stages and is discharged with the dough balls) is detrimental to the quality and to the finish or appearance of the final baked product.

It is the object of the present invention to avoid these drawbacks by providing a method and means for removing surplus flour adhering to the dough balls and if desired, collecting such flour together with the free flour just referred to.

While my improved method may be carried out in any convenient manner, I have described herein and shown in the accompanying drawings, as an example, a satisfactory apparatus for accomplishing the desired result. The apparatus, as illustrated, is arranged between the so-called automatic proofer and the moulder, but it is to be understood that this step in the treatment of the dough may be arranged at any other stage of manufacture of dough balls before such dough balls or rolls reach the final proofer; if desired, the operation may be carried out at one stage and repeated at another stage. These and other modifications may be made without departing from the spirit of my invention.

In the drawings,

Fig. 1 is a diagrammatic view of the apparatus referred to; Fig. 2 is an enlarged detail view of a portion of Fig. 1; and Fig. 3 is an enlarged horizontal section taken on line 3—3 of Figs. 1 and 2.

In Fig. 1, 10 represents an automatic proofer from which the dough balls 11 are delivered in any convenient manner to pockets or pans 12 carried by an endless conveyor 13 traveling in the direction of the arrow. At the left-hand turn of the conveyor the dough balls 11 are dropped into the funnel-shaped upper end of a pipe 14 which is also open at the bottom and terminates preferably a short distance from the receiving end 15 of a moulding apparatus 16 of well-known construction, in which the dough balls are moulded into dough rolls for delivery to the baking tins or pans, the discharge end of the moulder being indicated at 17. Connected with the pipe 14, at a point between its two open ends, is a branch pipe 18 leading to the inlet of a suction fan or other exhausting device 19, the outlet of which is connected with a settling tank 20 of any approved construction. Underneath the tank 20 is arranged a collecting receptacle 21.

The apparatus as described so far might in some cases be sufficient for accomplishing the desired result of removing surplus flour from the dough balls, together with the free flour accompanying such dough balls. In most cases, however, it is desirable to effect a jarring or jolting action on the dough balls, as they pass through the pipe 14, in order to shake loose the surplus flour adhering to their surface. This may be accomplished, for instance, by the following device, illustrated in detail in Figs. 2 and 3: Through the pipe 14 extends, on its side on which the branch pipe 18 is located, a rod 22 which is fulcrumed in bearings 23, 24 and held against longitudinal movement by a collar 25 on one side and by the hub of a lever 26 rigidly connected with said rod, on the other side. Inside the pipe 14 the rod 22 carries rigidly a number of fingers 27 of such a length as to obstruct free passage of the dough balls through the pipe 14. The fingers or dough-arresting members 27 are normally held in a substantially horizontal position by means of a coiled spring 28 one end of which is attached to the lever 26 while the other end of the spring is connected with an adjusting screw 29 adjustable up and down in a stationary bracket 30, thumb nuts 31, 32 serving to hold the screw against accidental movement. A stop 33 is provided on the bearing 24 to limit the upward movement of the lever 26 and fingers 27. The fingers 27, when in their upper, active position, are preferably slightly above the connection of the branch pipe 18 with the pipe 14.

The operation of the device will be readily understood and is, briefly described, as follows: As the dough balls drop, one by one, into the pipe 14, their fall is accelerated until they come into contact with the fingers 27 which arrest their fall temporarily, that is, for a short moment. The impact of the dough balls with the fingers 27 shakes loose any excess or surplus flour which may adhere to their surface. The tension of the spring 28 is so adjusted that this impact will immediately swing the arresting members downward, with the rod 22 as a fulcrum, to the position shown by dot-and-dash lines in Fig. 2, so that the members 27 will clear a passage for the dough balls and allow the latter to continue their downward fall into the hopper 15 of the moulding apparatus. The surplus flour shaken loose from the dough balls, together with any free flour which may drop from the pans 12 into the pipe 14, will be sucked into the exhauster 19 through the branch pipe 18. As mentioned above, the pipe 14 is open to the atmosphere both at the top and at the bottom, so that any flour which may get into the lower portion of the pipe 14 will also be sucked into the pipe 18 and exhauster 19. From the latter the flour reaches the settling tank 20 and the collecting bin or receptacle 21.

I claim as my invention:

1. The method of treating dough balls to remove excess flour from the surfaces thereof which consists in projecting the balls in an unsupported condition over an enclosed path, interposing a yielding resistance to the travel of said balls at a predetermined point in said path to jar excess flour therefrom, and subjecting said balls to the effects of suction in their passage over said path.

2. An apparatus for removing excess flour from dough balls, comprising a pipe through which said dough balls pass by gravity, said pipe being open to the outside air at both ends and having a branch connection between said ends, and means for exerting suction through said branch connection.

3. In apparatus for removing excess flour from dough balls, a passage through which said dough balls pass by gravity, a perforated member mounted to normally obstruct said passage and adapted to yield under the impact of said dough balls so as to open said passage for said dough balls, and means for exerting suction in said passage.

4. An apparatus for removing excess flour from dough balls, comprising a pipe through which said dough balls pass, said pipe being open to the outside air at both ends and having a branch connection between said ends, means in said pipe adjacent to said branch connection for jarring the dough balls passing through said pipe to free them of excess flour, and means for exerting suction through said branch connection.

5. An apparatus for removing excess flour from dough balls, comprising a pipe through which said dough balls pass, said pipe having a lateral outlet intermediate between its ends, means for jarring said dough balls adjacent to said lateral outlet to free them of excess flour, and means for removing said excess flour through said lateral outlet.

6. The method of treating dough balls to remove excess flour from the surface thereof which consists in passing said balls in an unsupported condition through a suction passage whereby the entire surface of said dough balls is exposed to the suction effect.

7. The method of treating dough balls to remove excess flour from the surface thereof which consists in permitting said balls to fall by gravity through a suction passage and subjecting said balls to a jarring action as they fall through said passage.

In testimony whereof I have signed this specification.

LAURENCE SEYMOUR HARBER.